2,993,999
PHOTOELECTRIC SENSING

Casmir Kay and John S. McMurtrie, Poughkeepsie, William J. Nestork, Watervliet, and Vernon O. Sturtevant, Hyde Park, N.Y., assignors to International Business Machines Corporation, New York, N.Y., a corporation of New York
Filed Oct. 30, 1959, Ser. No. 849,885
2 Claims. (Cl. 250—219)

This invention relates to sensing by light sensitive means and more particularly to a sensing means for statistical records using a PN junction type light sensitive cell.

Program drums of the type hereinafter described have been sensed by rotating star wheels that entered perforations in a card on a perforated drum. This type of sensing is subject to occasional failure due to wheels sticking and contact failure. Light sensitive sensing in a drum of this type has been impossible in the past due to the size and configuration of the light sensitive cells. With the PN type cell it is now possible to locate a plurality of such cells within a limited area.

It is therefore the principal object of this invention to provide a program drum in which the sensing is effected by a light sensitive device thus eliminating the faults of former sensing means.

A further object of this invention is to provide a light sensitive sensing device using a PN type cell.

The foregoing and other objects, features and advantages of the invention will be apparent from the following more particular description of a preferred embodiment of the invention, as illustrated in the accompanying drawings.

Figure 1:
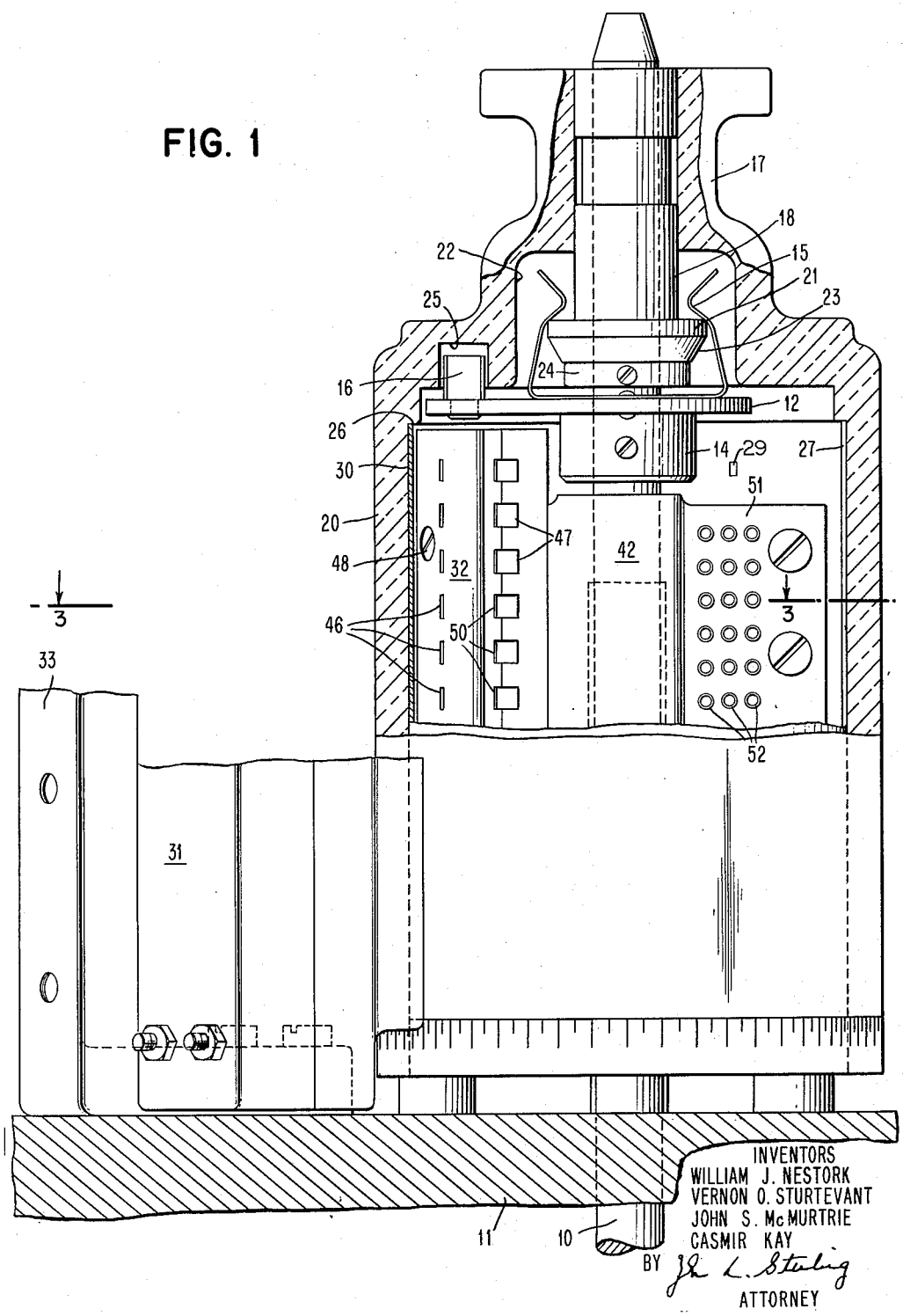
FIG. 1 is an elevation view of the invention in partial section to show details of the drum locking and sensing devices.
Figure 2:
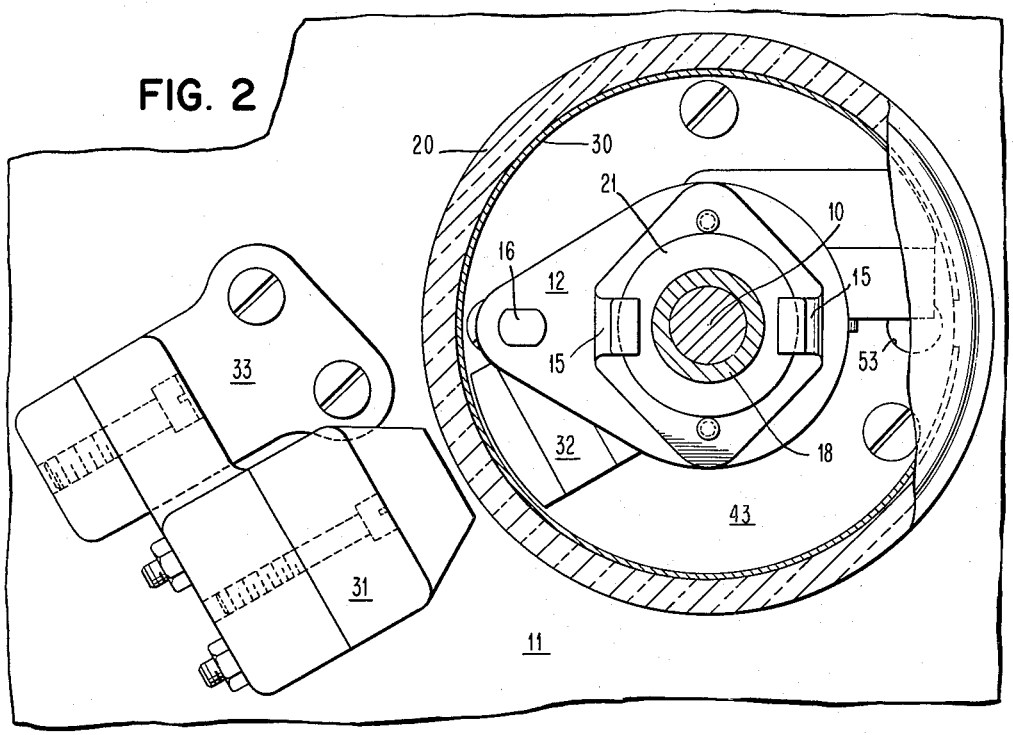
FIG. 2 is a plan view with parts broken away to show the relative location of the parts of the locking means.

The program drum illustrated in the drawing is similar in construction and function to that shown and described in the patent to E. W. Gardinor et al. 2,647,581, wherein sequential operation of a key punch is controlled by a card fastened about a perforated drum. The card—a program card—is sensed by so called star wheels or rotating contact closers. It is obvious that the present invention is not limited to use in a punch. Also its use as a device for storing data is fairly obvious.

A stud shaft 10 rotatably mounted in a frame 11 has secured thereon a plate 12 having an integral boss 14. Secured to the plate 12 by rivets or any well known means is a U-shaped spring 15 and a pin 16.

A hollow drum 20 of transparent plastic is adapted to be positioned on the shaft 10. The drum is open at one end and formed with a handle portion 17. Inserted in an aperture in the handle by a force fit is a metal locking member 18 having a head 21 formed thereon. The head is located in a cavity 22 and is provided with a cam surface 23 that engages and spreads the spring 15. Adjustably secured to the shaft 10 is a locating collar 24.

In operation the drum is positioned over the shaft 10 and pressed down until the cam surfaces 23 open the spring 15 to admit the head of locking member 18. The drum is rotated until the pin 16 engages a hole 25 in the head of the drum. The collar 24 and plate 12 are adjusted on the shaft so that the arms of spring 15 engage the locking member 21 as shown in FIG. 1. In this position the drum is restrained from any end wise play with regard to the shaft 10.

Figure 3:
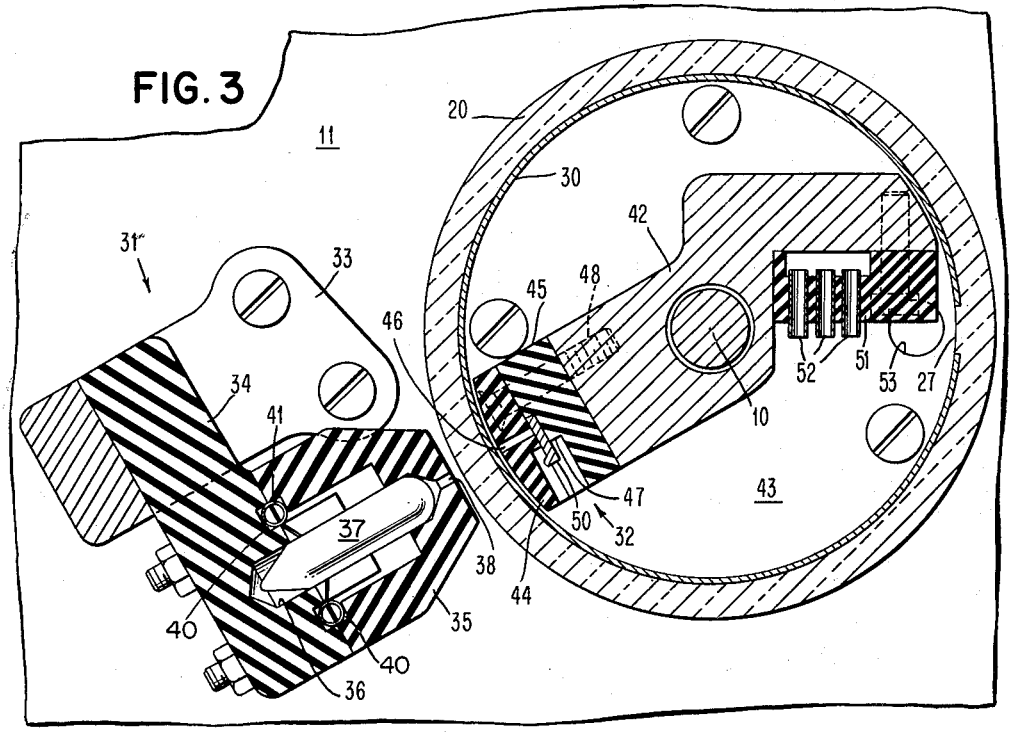
FIG. 3 is a cross section taken along line 3—3 of FIG. 1 showing the sensing device.

The inner cavity of the drum is provided with a circular shoulder 26 and a longitudinal shoulder 27 (FIG. 3). An opaque card 30 containing data in the form of perforations 29 or a transparent card with opaque spots representing data may be used with the device. The card is curled and inserted in the drum until the innermost edge registers with the shoulder 26 and the longitudinal edges are in register with the edges of shoulder 27. Due to the card being enclosed within the drum it is protected from damage which could alter the data representations. The base of the drum is provided with a scale that coincides with the columns of data on the card.

The sensing mechanism is enclosed within housings of plastic or other suitable materials and comprises a light source 31 and a light sensitive device 32. The light source 31 is a multiple lamp housing secured to an upright L-shaped post 33 secured to the base 11 in any well known manner. The lamp housing is made in two parts; one the base 34 and cover 35. The base is formed with a plurality of cavities 36 of sufficient depth to accommodate the base of pigtail type lamps 37. The cover 34 is shaped as shown to accommodate the end of a lamp 36 and is provided with a light aperture 38. Extending longitudinally on each side of the cavities 36 and along the inner corners of cover 34 is a slot 40 in which is positioned a coil spring 41. This spring forms a quick connection for the pigtails of the lamps 37 that are inserted between the spirals of the spring.

The light sensitive device 32 is located within the drum and is secured to a post 42 enclosing shaft and formed on a circular base member 43. The member 43 is in turn secured to the frame 11. The circular base is the same diameter as that of the inside of the drum 20 and acts as a bearing for the drum during rotation. The device 32 comprises two strips 44 and 45 of insulating material such as a phenolic or the like. The strip 44 is curved on one longitudinal surface to fit the curvature of the drum and is provided with light slots 46. Located in cavities 47 in the strip 45 is a plurality of light sensitive cells 50 such as silicon cells of the PN type or the like. The two strips 44 and 45 are secured together and in turn secured to the post 42 by any well known means such as screws 48. Also secured to the post 42 is a strip 51 of insulating material such as a phenolic in which are imbedded jack contacts 52. Electrical connections from the cells 50 are carried by cable (not shown) to the jacks 52. From the jacks a cable not shown may carry the connections out of the drum through the apertures 53.

In operation the card 30 is positioned in the drum 20 and the drum is secured on the shaft 10 as explained above. There is a lamp 40 and a light sensitive cell 50 for each column of index positions on the card. As the drum is rotated the perforations open paths for the light from one or more lamps to pass through slots 38 and 46 and activate one or more cells 50.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a device of the type described, a transparent drum, an opaque record containing perforated data, said record being positioned within a cavity in said drum, a light source, a plurality of PN junction type light sensitive cells, a driving means, and a stop within said drum for positioning said record with relation to said cells, said drum being removably secured to said driving means whereby said record is passed between said light source and cells to activate said cells in accordance with said perforated data.

2. In a device of the type described, a transparent drum, an opaque record containing perforated data, said record being positioned within a cavity in said drum, a light source, a plurality of PN junction type light sensitive cells positioned within said drum, a driving means, and a stop within said drum for positioning said record with relation to said cells, said drum being removably secured to said driving means whereby said record is passed between said light source and cells to activate said cells in accordance with said perforated data.

References Cited in the file of this patent

UNITED STATES PATENTS

| | | |
|---|---|---|
| 2,570,978 | Pfann | Oct. 9, 1951 |
| 2,578,037 | Berlant | Dec. 11, 1951 |
| 2,693,734 | Coleman et al. | Nov. 9, 1954 |
| 2,921,204 | Hastings et al. | Jan. 12, 1960 |